United States Patent Office 2,918,470
Patented Dec. 22, 1959

2,918,470

ACID-ADDITION, QUATERNARY SALTS AND METHOD OF PREPARING SAME

John Krapcho, Perth Amboy, and William A. Lott, Maplewood, N.J., assignors to Olin Mathieson Chemical Corporation, New York, N.Y., a corporation of Virginia No Drawing. Application March 14, 1955
Serial No. 494,260

14 Claims. (Cl. 260—286)

This invention relates to, and has for its object, the provision of, compounds containing both a quaternary group and an acid-addition group; and methods of preparing them.

The compounds of this invention are acid-addition salts of compounds of the general Formula I

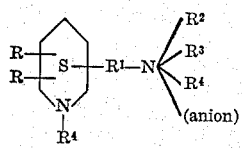

wherein each R represents a member of the class consisting of hydrogen and lower alkyl, and when taken together with the piperidyl group to which they are joined, form a polyhydroquinolyl group; $R^1$ is a member of the class consisting of alkylene and phenyl-substituted alkylene; $R^2$ and $R^3$ each represent a lower alkyl group and when taken together with the nitrogen, represent 1-piperidyl, 4-morpholinyl, and 1-pyrrolidyl; and each $R^4$ represents a member of the class consisting of lower alkyl and aralkyl groups. The polyhydroquinolyl group is exemplified by tetrahydro quinolyl and decahydroquinolyl groups; and both the polyhydroquinolyl group and the quaternized heterocyclic group may contain substituents such as lower alkyl or lower alkoxy. Those compounds wherein $R^4$ is a lower alkyl and where there is a six carbon chain separating the nitrogens are preferred.

The compounds of this invention are useful as bactericides and/or surface-active agents. Certain of the compounds have hypotensive action and are especially valuable in the treatment of essential hypertension, being administered for that purpose in the same general manner and in the same type of formulations as the hypotensive agent hexamethonium bromide. The compound [3-(1-methyl-4-piperidyl)propyl]trimethylammonium bromide hydrobromide is a more potent and/or better absorbed hypotensive agent than the corresponding di-(acid-addition) or di-quaternary compound; and it can be used to advantage concurrently, or in conjunction, with other hypotensive agents, such as *Rauwolfia serpentina* or a fraction thereof, as reserpine.

Among the preferred compounds of the invention are the acid-addition salts of the polyhydroquinolyl compounds. Thus, trimethyl [3-(1,2,3,4-tetrahydro-1-methyl-4-quinolyl)propyl] ammonium bromide hydrobromide (see Example 11) is a hypotensive agent of unexpectedly long duration.

The compounds of this invention are prepared by the method which essentially comprises catalytic-hydrogenation of a diquaternary salt (cf. II hereinafter). This reduction is preferably effected by treatment with hydrogen in the presence of a suitable catalyst, such as palladium black, copper chromite, Raney nickel and platinum dioxide, until the required amount of hydrogen has been absorbed. Advantageously, a carrier-supported catalyst such as palladium-charcoal, rhodium-charcoal, or palladium-barium sulfate is utilized. In the case of platinum dioxide, the catalytic-hydrogenation may be effected at superatmospheric pressure (e.g., about 2 to 3 atmospheres) and/or at slightly elevated temperatures to expedite the hydrogenation. Thus in the preparation of piperidine compounds, the time of the hydrogenation (varying with the catalyst and the conditions employed) is that required to effect the "addition" of substantially 3 moles of hydrogen (or 4 moles when the reactant contains an unsaturated side chain; cf. Example 15) per mole of reactant. The catalytic-hydrogenation may be effected in any medium which does not chemically affect the reactant, inter alia, dioxane, water, and alcohol (benzyl alcohol, methanol and preferably ethanol); and other means than that specifically disclosed hereinafter may be employed to effect intimate contact between the hydrogen and the reactant and hydrogenation catalyst.

A scheme of synthesis, including methods whereby the diquaternary reactant is prepared, follows:

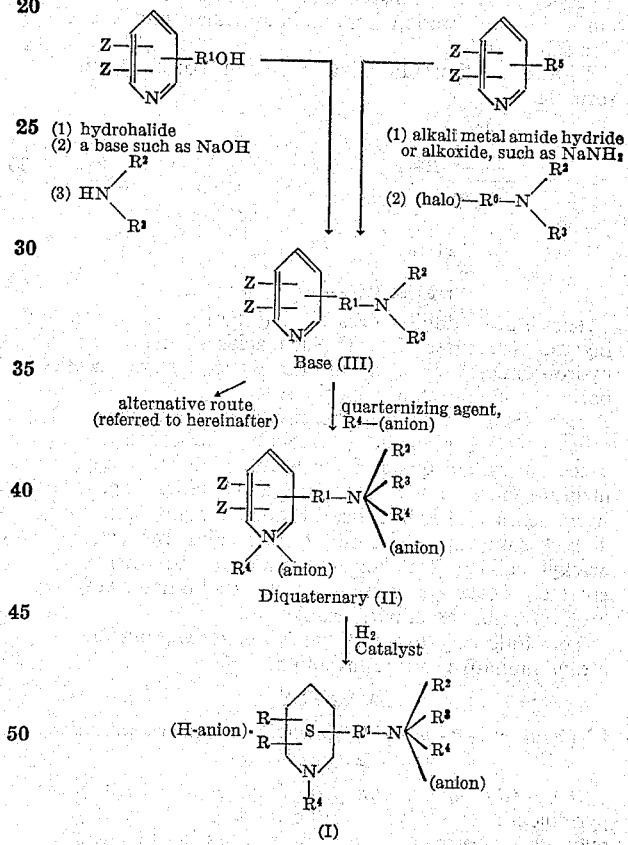

In the foregoing scheme, $R^5$ is a member of the class consisting of alkyl and phenyl-substituted alkyl; $R^6$ is a member of the class consisting of alkylene and phenyl-substituted alklene; $R^5$ and $R^6$ being so chosen that together they equal $R^1$; and each Z represents a member of the class consisting of hydrogen and lower alkyl and when taken together with the pyridyl group to which they are joined, form a quinolyl group. Examples of such Z-substituted unsaturated heterocyclic groups include inter alia: pyridyl, quinolyl, 3-ethylpyridyl, 5-methylpyridyl, 6-methoxyquinolyl, and 7-methylquinolyl.

Diquaternary salts II utilizable in the practice of this invention include, inter alia: 4-(3-dimethylaminopropyl)-1,6-dimethylquinolinum bromide, methobromide; 4-(3-dimethylaminopropyl) - 1 - methylpyridinium bromide, methobromide; 4-(3 - dipropylaminoethyl)-1-methylpyridinium bromide, methobromide; 4-(3-morpholinopropyl)-1 - methylpyridinium bromide, methobromide; 4 - [2 - (2- methylpiperidino)propyl]-1-methylpyridinium bromide, methobromide; 4-[3-diethylamino) - 1 - phenylpropyl]-1-ethylpyridinium chloride, ethochloride; 4-[3-(dimethylamino) - 1 - butylpropyl] - 1 - methylpyridinium bromide, methobromide; 4-(3-pyrrolidinopropyl) - 1 - ethylpyridinium chloride, ethochloride; 4-(1-benzyl-3-pyrrolidinopropyl)-1-methylpyridinium bromide, methobromide; 2-(5-dimethylaminopentyl) - 1 - methyl-5-ethylpyridinium bromide, methobromide; 4-(dimethylaminomethyl)-1-methylpyridinium bromide, methobromide; 3-(2-morpholinoethyl)-1-methylpyridinium bromide, methobromide; 3-diethylaminomethyl-1-methylpyridinium bromide, methobromide; 2-[3-(dimethylamino)-1-phenylpropyl]-1, 6-dimethylpyridinum bromide, methobromide; 2-(4-dimethylaminobutyl)-1-methyl-5-ethylpyridinium bromide, methobromide; 4-[3-(dimethylamino)-1-ethylpropyl]-1-methylpyridinium bromide, methobromide; 2-(3-dimethylaminopropyl-1-methylquinolinium chloride, methochloride; 4-(3 - dimethylaminopropyl)-1-methyl-6-methoxyquinolinium bromide, methobromide; and 4-(3-pyrrolidinopropyl)-1-methylquinolinium chloride, ethochloride.

Alternatively, the acid-addition quaternary salts of this invention may be prepared from a base which has been purified by preparation from an intermediate di-acid-addition salt as follows:

Di-acid-addition salt of a compound of the general formula:

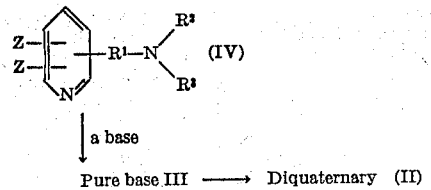

$$\text{Pure base III} \longrightarrow \text{Diquaternary (II)}$$

The di-acid-addition salts IV may be formed by reacting the free bases III with such acids as hydrochloric, hydrobromic, hydriodic, sulfuric, citric, tartaric, acetic, boric, nitric, phosphoric, or gluconic.

As shown schematically hereinbefore, the diquaternary salts (II) are prepared by reacting the corresponding bases III with a quaternizing agent. Utilizable quaternizing agents include, inter alia, alkylhalides (e.g. ethyl bromide, methyl iodide, octyl bromide, methyl chloride), dialkyl sulfates (e.g. diethylsulfate, dimethyl sulfate), aralkyl halides (e.g. benzyl bromide), and esters (e.g. ethyl chloroacetate, methyl p-toluene-sulfonate, ethyl-α-bromopropionate, ethyl nitrate).

The following examples are illustrative, but by no means limitative, of the invention:

EXAMPLE 1

[3-(1-methyl - 4 - piperidyl)propyl] trimethylammonium bromide hydrobromide (a) 4-(3-dimethylaminopropyl)pyridine.—137.0 g. 4-pyridinepropanol is added in portions to 600 ml. of 48% hydrobromic acid and the resulting solution refluxed for eight hours. After distillation of about 500 ml., the residue is cooled and treated with a solution of 100 g. of sodium hydroxide in 200 ml. of water. The liberated 4-(3-bromopropyl) pyridine is extracted twice with 100 ml. portions of benzene, the combined extract dried over magnesium sulfate for fifteen minutes, cooled, and treated portionwise with a cold solution of 152 g. of dimethylamine in 500 ml. of benzene. A heavy precipitate forms. After standing for two days at room temperature, the mixture is refluxed for six hours, cooled, and treated with a solution of 60 g. of sodium hydroxide in 100 ml. of water. The mixture is refluxed for two hours, cooled, and the benzene layer decanted from the aqueous phase. The latter layer is extracted with benzene, combined with the previous benzene layer and dried over magnesium sulfate. After evaporation of the solvent, the residue is fractionated to yield about 133 g. of colorless liquid; B.P. about 90–92° C. (3 mm.).

Alternatively the base is prepared as follows: A suspension of 19.5 g. of sodamide in 150 ml. of toluene is treated with a solution of 46.6 g. of γ-picoline in 100 ml. of toluene and the resulting mixture refluxed for two hours. After cooling, a solution of 54.5 g. of freshly-prepared 2-dimethylaminoethyl chloride in 150 ml. of toluene is added and the mixture refluxed for two hours. The reaction mixture is cooled, extracted three times with 150 ml. portions of water and the organic phase dried over magnesium sulfate. After fractionation of the solvent, the product, 4-(3-dimethylaminopropyl)pyridine is collected at 72–80° C. (0.5 mm.); yield about 10 g.

(b) 4-(3 - dimethylaminopropyl)-1-methylpyridinium bromide, methobromide.—A solution of 49.3 g. of the base, 4-(3-dimethylaminopropyl)pyridine, prepared as described in Example 1a, in 150 ml. of absolute alcohol is cooled and treated portionwise with a solution of 85.5 g. of methyl bromide in 150 ml. of acetone; and a crystalline solid separates from solution. After standing at room temperature for two days, the product is filtered and dried; yield about 101.6 g., M.P. about 251–252° C. (dec.). Recrystallization of 140 g. of this material from 600 ml. of absolute alcohol yielded about 132 g. of colorless product; 4-(3 - dimethylaminopropyl)-1-methylpyridinium bromide methobromide; M.P. about 253–254° C. (dec.).

(c) [3-(1-methyl-4-piperidyl)propyl] trimethylammonium, hydrobromide.—A suspension of 23 g. of the diquaternary compound, described in Example 1b, in 160 ml. of absolute alcohol is treated with 0.5 g. of platinum oxide and placed under fifty-six pounds of hydrogen. The theoretical quantity of hydrogen is consumed in sixteen minutes. At this point the product crystallizes from the reaction mixture. The product from four similar runs is combined, dissolved in about one liter of absolute alcohol and filtered. The product, [3-(1-methyl-4-piperidyl)propyl] trimethylammonium bromide hydrobromide, crystallized from the filtrate, weighs about 83 g.; M.P. about 250–251° C.

Use of a molar equivalent of ethyl chloride in place of methyl bromide in (b) of Example 1 yields first 4-(3-dimethylaminopropyl)-1-ethylpyridinium chloride ethochloride, and then [3-(1-ethyl-4-piperidyl)propyl] dimethylethylammonium chloride hydrochloride.

Use of a molar equivalent of dimethylsulfate in place of methyl bromide in Example 1b yields first 4-(3-dimethylaminopropyl) - 1 - methylpyridinium methylsulfate dimethosulfate, and then trimethyl [3-(1-methyl-4-piperidyl)propyl] ammonium methylsulfate, hydrogen methylsulfate.

EXAMPLE 2

1-methyl-1-[3-(1 - methyl-4-piperidyl)propyl]-pyrrolidinium bromide, hydrobromide (a) 4-(3-pyrrolidinopropyl)pyridine.—A benzene solution of 4-(3-bromopropyl)pyridine (prepared from 137 g. of 4-pyridinepropanol as described in Example 1a) is added to a solution of 213 g. of pyrrolidine in 300 ml. of benzene while maintaining the temperature at 30–40° C. After standing for two days at room temperature, the mixture is refluxed for three hours, cooled and treated portionwise with a solution of 60 g. of sodium hydroxide in 100 ml. of water. The top layer is decanted and the lower phase extracted with benzene. The two benzene layers are combined and dried over magnesium sulfate. After evaporation of the solvent, the product is fractionated to yield about 146.5 g. of product, 4-(3-pyrrolidinopropyl)pyridine; B.P. 132–135° C. (5 mm.).

(b) 4-(3-pyrrolidinopropyl)-1-methylpyridinium bromide, methobromide.—A solution of 28.6 g. of the base, 4-(3-pyrrolidinopropyl)pyridine, prepared in section (a) of Example 2, in 100 ml. absolute alcohol is treated with a solution of 42.7 g. of methyl bromide in 75 ml. of acetone. After standing for three days at room temperature, the solution is diluted with about 500 ml. of ether to yield an oil which solidifies after trituration with ether; yield about 55.8 g., M.P. about 183–190° C. The product, 4-(3-pyrrolidinopropyl)-1-methylpyridinium bromide, methobromide, recrystallized from 150 ml. of isopropyl alcohol, weighs about 50.3 g., M.P. about 191–193° C.

(c) *1-methyl-1[3-(1-methyl-4-piperidyl)propyl] pyrrolidinium bromide, hydrobromide.*—A solution of 32 g. 4-(3-pyrrolidinopropyl)-1-methylpyridinium bromide methobromide, prepared in section (b) of Example 2, is dissolved in 200 ml. of absolute alcohol, treated with 0.5 g. of platinum oxide and placed under fifty-five pounds of hydrogen. The theoretical quantity of hydrogen is consumed in seventy-seven minutes. The solution is filtered, diluted with about 500 ml. of ether to yield a colorless solid, M.P. about 215–218° C.; yield about 32.5 g. After crystallization from 60 ml. of absolute alcohol, the colorless product weighs about 28.5 g.; M.P. about 216–218° C.

EXAMPLE 3

Use of a molar equivalent of (2-hydroxyethyl)methylamine in place of dimethylamine in Example 1 yields first 4-{3-[N-(2-hydroxyethyl)-N-methylamino] propyl}-1-methylpyridinium bromide methobromide, and then [3-(1-methyl-4-piperidyl)propyl] (2-hydroxyethyl)dimethylammonium bromide hydrobromide.

EXAMPLE 4

Use of a molar equivalent of diisopropylamine in place of dimethylamine in Example 1 yields first 4-(3-diisopropylaminopropyl)-1-methylpyridinium bromide methobromide, and then [3-(1-methyl-4-piperidyl)propyl] diisopropylmethylammonium bromide hydrobromide.

EXAMPLE 5

*Trimethyl[2-(1-methyl-4-piperidyl)ethyl]ammonium bromide, hydrobromide*

(a) *4-(2-dimethylamino)pyridine.*—A mixture of 53.0 g. of 4-vinylpyridine and 170 g. of 40% aqueous dimethylamine is allowed to stand overnight and then heated on a steam bath for eight hours. The mixture is cooled, treated with 100 g. of potassium carbonate and the liberated base extracted with ether. After drying over magnesium sulfate, the solvent is evaporated and the residue distilled to give about 61.9 g. of product, 4-(2-dimethylaminoethyl)pyridine, B.P. 70° C. (2 mm.).

(b) *4-(2-dimethylaminoethyl)-1-methylpyridinium bromide, methobromide.*—A solution of 30.0 g. of the base, 4-(2-dimethylaminoethyl)pyridine, in 100 ml. of absolute alcohol is treated with a solution of 57 g. of methyl bromide in 105 ml. of acetone with cooling. The product rapidly crystallizes from the mixture. After standing at room temperature for several days, the product, 4-(2-dimethylaminoethyl)-1-methylpyridinium bromide methobromide, is filtered and dried; yield, about 55 g.; M.P. about 230–233° C.

(c) *Trimethyl[2-(1-methyl-4-piperidyl)ethyl]ammonium bromide, hydrobromide.*—A solution of 17.0 g. of the diquaternary salt, prepared in Example 5b, in 100 ml. of water is treated with 0.3 g. of platinum oxide and placed in a Parr apparatus at fifty-five pounds of hydrogen. The reduction is complete in five hours. The catalyst is filtered and the filtrate diluted with 800 ml. of acetone. The oil which initially separates from the solution gradually solidifies. The product is filtered to yield about 8.0 g. of colorless material, M.P. about 320° C. (dec.). This product is dissolved in 25 ml. of warm water and diluted with 450 ml. of acetone. The colorless product, trimethyl [2-(1-methyl-4-piperidyl) ethyl]ammonium bromide, hydrobromide weighs about 7.7 g., M.P. about 320° C. (dec.). After recrystallization from methanol, the melting point is about 328° C. (dec.).

EXAMPLE 6

Use of a molar equivalent of diethylamine in place of dimethylamine in Example 5 yields first 4-(2-diethylaminoethyl)-1-methylpyridinium bromide methobromide, and then, diethylmethyl [2-(1-methyl-4-piperidyl)ethyl] ammonium bromide hydrobromide.

EXAMPLE 7

*Trimethyl[5-(1-methyl - 2 - piperidyl)pentyl]ammonium bromide, hydrobromide*

(a) *2-(5-phenoxypentyl)pyridine.* — A solution of phenyl lithium (prepared from 14 g. of lithium wire, 157 g. of bromobenzene and 650 ml. of ether) is treated dropwise with a solution of 93.0 g. of α-picoline in 100 ml. of benzene during a period of one hour. After completion of the addition, the mixture is stirred for one and one-half hours at room temperature and then treated dropwise (over a period of one hour) with a solution of 205.0 g. of 5-phenoxybutyl bromide [J. Org. Chem. 18, 575 (1953)], in 200 ml. of benzene. The mixture is allowed to stand overnight at room temperature, refluxed for one hour, cooled and treated with 100 ml. of water to dissolve the inorganic salts. The aqueous phase is discarded and the organic phase extracted with a solution of 100 ml. of concentrated hydrochloric acid in 100 ml. of water yielding a 2-(5-phenoxypentyl)-pyridine hydrochloride. The resulting aqueous phase is washed once with ether and then basified with a solution of 80 g. of sodium hydroxide in 100 ml. of water. The liberated base is extracted with ether and the combined extracts dried over magnesium sulfate. After evaporation of the solvent, the product, 2-(5-phenoxypentyl)-pyridine is fractionated to yield about 103 g. of a pale-yellow liquid, B.P. about 147–150° C. (0.1 mm.).

(b) *2-(5-dimethylaminopentyl)pyridine.*—90.0 g. 2-(5-phenoxypentyl)pyridine, prepared in 7(a) is added to 400 ml. of 48% hydrobromic acid and the resulting solution refluxed for eighteen hours. Approximately 320 ml. of distillate is collected by atmospheric distillation, the residue cooled, and basified with a solution of 50 g. of sodium hydroxide in 100 ml. of water. The liberated 2(5-bromopentyl)pyridine is extracted with two 100 ml. portions of benzene and the extract dried over magnesium sulfate for about fifteen minutes and filtered. The filtrate is treated with the cold solution of 88 g. of dimethylamine in 300 ml. of benzene.

After standing at room temperature for three days, the mixture is refluxed for six hours, cooled and treated with a solution of 30 g. of sodium hydroxide in 50 ml. of water. The organic phase is decanted and the aqueous layer extracted with benzene. The combined organic phase is dried over magnesium sulfate. After evaporation of the solvent, the residue is rapidly distilled at 96–140° C. at 2 mm. (about 37.8 g.) and subsequently fractionated to yield about 31.8 g. of product, 2-(5-dimethylaminopentyl)pyridine; B.P. 100–108° C. (2 mm.). This pale yellow distillate rapidly turns red in color and is immediately treated with methyl bromide.

(c) *2 - (5 - dimethylaminopentyl) - 1 - methylpyridinium bromide, methobromide.*—A solution of 15.2 g. of the base, 2-(5-dimethylaminopentyl)pyridine, prepared in Example 7(b) in 30 ml. of absolute alcohol is treated with a solution of 23.8 g. of methyl bromide in 41 ml. of acetone. After standing at room temperature for two days, the mixture is diluted with 100 ml. of acetone, cooled and the nearly colorless product filtered and dried; yield about 21.6 g., M.P. about 195–198° C. After recrystallization from 40 ml. of absolute alcohol, the colorless product, 2-(5-dimethylaminopentyl)-1-methylpyridinium bromide, methobromide, weighs about 18.5 g., and melts at about 199–200° C.

(d) *Trimethyl[5 - (1 - methyl - 2 - piperidyl)pentyl]-ammonium bromide, hydrobromide.*—A solution of 16.5 g. of the diquaternary salt prepared in 7(c) in 140 ml.

of absolute alcohol is treated with 0.5 g. of platinum oxide and placed in the Parr apparatus at fifty-three pounds of hydrogen. The reduction is complete in one hour. The catalyst is filtered and the filtrate diluted to about 400 ml. with ether. The colorless precipitate, filtered and dried, weighs about 16.3 g., M.P. about 228–229° C. After recrystallization from 50 ml. of absolute alcohol, the product, trimethyl[5-(1-methyl-2-piperidyl)pentyl]ammonium bromide, hydrobromide, weighs about 15.0 g., M.P. about 230–231° C.

EXAMPLE 8

Use of a molar equivalent of 4-(2-dimethylaminoethyl)-3-ethylpyridine in place of 4-(2-dimethylaminoethyl)pyridine in section (b) of Example 5 yields first 4-(2-dimethylaminoethyl)-3-ethyl-1-methyl-pyridinium bromide methobromide, and then trimethyl [2-(1-methyl-3-ethyl-4-piperidyl)ethyl]ammonium bromide hydrobromide.

EXAMPLE 9

*Trimethyl[4-(1-methyl-4-piperidyl)-butyl]ammonium bromide hydrobromide*

(a) *4-(4-dimethylaminobutyl)pyridine.*—A suspension of 19.5 g. of sodamide in 100 ml. of toluene is treated with a solution of 46.5 g. of γ-picoline in 100 ml. of toluene and the resulting mixture refluxed for two hours. The dark solution is cooled and treated with a solution of 41.4 g. of 3-dimethylaminopropyl chloride in 100 ml. of toluene. The mixture is refluxed for three hours, cooled and treated with 100 ml. of water in order to dissolve the inorganic salts. The aqueous layer is discarded and the organic phase, extracted with a solution of 100 ml. of concentrated hydrochloric acid in 100 ml. of water, contains 4-(4-dimethylaminobutyl)pyridine hydrochloride. This aqueous phase is then basified with a solution of 60 g. of sodium hydroxide in 100 ml. of water. The liberated base is extracted with ether and dried over magnesium sulfate. After evaporation of the solvent, the product, 4-(4-dimethylaminobutyl)pyridine, distills at about 95–105° C. at 2 mm., yield 10.5 g.

(b) *(4-dimethylaminobutyl)-1-methylpyridinium bromide, methobromide.*—A solution of 10.8 g. of the base, 4-(4-dimethylaminobutyl)pyridine, prepared in 9a in 25 ml. of absolute alcohol is cooled and treated with a solution of 23.8 g. of methyl bromide in 41 ml. of acetone. After standing for four days at room temperature, the mixture is cooled and filtered; yield about 19.5 g.; M.P. about 208–209° C. The product, (4-dimethylaminobutyl)-1-methylpyridinium bromide methobromide, is recrystallized from 50 ml. of absolute alcohol; yield about 17.5 g.; M.P. about 209–210° C.

(c) *Trimethyl[4 - (1 - methyl - 4 - piperidyl)butyl]-ammonium bromide, hydrobromide.*—A solution of 17.0 g. of the diquaternary salt, prepared in Example 9(b), in 160 ml. of absolute alcohol is reduced in the manner described in Example 1. The product, trimethyl[4-(1-methyl-4-piperidyl)butyl]ammonium bromide, hydrobromide, weighs about 16.7 g. and melts at about 228–229° C.

EXAMPLE 10

*Trimethyl[3-(1-methyl-4-piperidyl)propyl]ammonium chloride, hydrochloride*

(a) *4 - (3 - dimethylaminopropyl) - 1 - methylpyridinium chloride, methochloride.*—A solution of 113 g. of the base, 4-(3-dimethylaminopropyl)pyridine (described in Example 1), in 1 liter of acetonitrile is cooled and treated with 208 g. of methyl chloride gas. A crystalline material separates after about one hour. After standing at room temperature for four days, the hygroscopic colorless product is filtered and dried, weighs about 143 g. and melts at about 255° C. (dec.). The product, 4-(3-dimethylaminopropyl)-1-methylpyridinium chloride, methochloride, crystallized from absolute alcohol, melts at about 261.5° C. (dec.).

(b) *Trimethyl - [3 - (1 - methyl - 4 - piperidyl)propyl]ammonium chloride, hydrochloride.*—A warm solution of 40 g. of the diquaternary salt, prepared in 10a, in 160 ml. of absolute alcohol is treated with 0.5 g. of platinum oxide and the mixture placed under fifty-seven pounds of hydrogen. Reduction is complete in two and one-half hours. The catalyst is filtered and the combined filtrate from four runs (utilizing 142.7 g. of starting material) is diluted with one liter of ether. The colorless hygroscopic product, trimethyl[3-(1-methyl-4-piperidyl)-propyl]ammonium chloride hydrochloride, which precipitates weighs about 146 g.; M.P. about 250–251° C. (dec.). After recrystallization from 500 ml. of isopropyl alcohol, the hygroscopic product melts at about 250–251° C. (dec.).

EXAMPLE 11

*Trimethyl[3 - (1,2,3,4 - tetrahydro - 1 - methyl - 4 - quinolyl)propyl]ammonium bromide, hydrobromide, monohydrate*

(a) *4-(3-dimethylaminopropyl)quinoline.*—A suspension of 19.5 g. of sodamide in 100 ml. of toluene is treated with a solution of 71.6 g. of lepidine in 100 ml. of toluene. The resulting dark mixture is refluxed for one hour, cooled and treated with a toluene solution of 2-dimethylaminoethyl chloride (liberated from 79 g. of the hydrochloride salt by dissolving in 25 ml. of water and treating with 50 ml. of concentrated ammonia, extracting with four 50 ml. portions of toluene and drying over magnesium sulfate). The mixture becomes warm and cooling is applied. After the exothermic reaction subsides, the mixture is refluxed for ninety minutes, cooled and treated with 100 ml. of water in order to dissolve the inorganic salts. The aqueous phase is discarded and the toluene layer, extracted with a solution of 100 ml. of concentrated hydrochloric acid in 100 ml. of water, contains 4 - (3 - dimethylaminopropyl)quinoline dihydrochloride. The acidic aqueous extract is then basified with a solution of 60 g. of sodium hydroxide in 100 ml. of water, the liberated base extracted with ether and dried over magnesium sulfate. After evaporation of the solvent, the residue is rapidly distilled and the cut collected at about 114–200° C. at 2 mm. is fractionated, yielding about 31.8 g. of product, 4-(3-dimethylaminopropyl)quinoline; B.P. about 122–127° C. (0.2 mm.). This yellow liquid turns red on exposure to air and is immediately converted to the quaternary salt.

(b) *4-(3-dimethylaminopropyl)-1-methylquinolinium bromide, methobromide.*—A solution of 20.2 g. (0.094 mole) of the base 4-(3-dimethylaminopropyl)quinoline is treated with a solution of 26.8 g. (0.28 mole) of methyl bromide in 50 ml. of acetone. A heavy precipitate separates from the mixture after several minutes. After standing at room temperature for several days, the mixture is diluted with ether to yield a gummy mass which is triturated with 100 ml. of acetone and then with 100 ml. of hot isopropyl alcohol. The mixture, cooled, filtered and dried, weighs about 28.0 g., M.P. about 245–248° C. (dec.). After recrystallization from 150 ml. of absolute alcohol, the nearly colorless product, 4-(3-dimethylaminopropyl) - 1 - methylquinolinium bromide, methobromide, weighs about 23.5 g., and melts at about 248–250° C. (dec.).

(c) *Trimethyl[3 - (1,2,3,4 - tetrahydro - 1 - methylquinol-4-yl)propyl]-ammonium bromide, hydrobromide, monohydrate.*—A solution of 40.4 g. of the diquaternary salt prepared as in 11(b) in 50 ml. water and 100 ml. absolute alcohol is heated with 1.0 g. of platinum oxide and placed in a Parr apparatus at fifty-seven pounds of hydrogen, temperature 45–50° C. Reduction is complete in about three hours. The catalyst is filtered and solvent removed under reduced pressure to yield an oil. The latter is dissolved in 100 ml. absolute alcohol and the solvent again removed under reduced pressure. The product is redissolved in 100 ml. absolute alcohol and treated with 100 ml. benzene and the solvent again removed. The process repeated with 100 ml. absolute alcohol, yields a crystalline residue. The latter material dissolved in 150 ml. absolute alcohol and diluted with 700 ml. ether yields an oil which solidifies on standing. This solid triturated with acetone and filtered yields about 40 g. of material, the monohydrate of trimethyl[3-(1,2,3,4 - tetrahydro - 1 - methyl - 4 - quinolyl)propyl]ammonium bromide, hydrobromide; M.P. about 187–190° C. (dec.).

Use of a molar equivalent of (2-pyrrolidino)ethyl chloride in place of dimethylaminoethyl chloride in Example 11 yields first 4-(3-pyrrolidinopropyl)1-methylquinolinium bromide methobromide, and then methyl[3-(1,2,3,4 - tetrahydro - 1 - methyl - 4 - quinolyl)propyl]pyrrolidinium bromide hydrobromide.

Use of a molar equivalent of 4-(2-dimethylaminoethyl) quinoline in Example 11 yields first 4-(2-dimethylaminoethyl)-1-methylquinolinium bromide methobromide, and then trimethyl[2-(1,2,3,4-tetrahydro-1-methyl-4-quinolyl)ethyl]ammonium bromide hydrobromide.

Use of a molar equivalent of methyl chloride in section (b) of Example 11 yields 4-(3-dimethylaminopropyl)-1-methylquinolinium chloride, methochloride, and, ultimately, trimethyl[3 - (1,2,3,4 - tetrahydro - 1 - methyl-4-quinolyl)propyl]ammonium chloride, hydrochloride.

Use of a molar equivalent of 8-(diethylaminomethyl)-quinoline in place of 4-(3-dimethylaminopropyl)quinoline in Example 11 yields first the corresponding dimethobromide and then the corresponding polyhydroquinolyl hydrobromide acid-addition salt.

Use of a molar equivalent of 6-(piperidinomethyl)-quinoline in place of 4-(3-dimethylaminopropyl)quinoline in Example 11 yields first the corresponding dimethobromide and then the corresponding polyhydroquinolyl hydrobromide acid-addition salt.

EXAMPLE 12

Diethylmethyl[3 - (1 - methyl - 4 - piperidyl)propyl]ammonium bromide, hydrobromide (a) 4-(3-diethylaminopropyl)pyridine.—Use of 220 g. diethylamine in place of the pyrrolidine in Example 2, yields about 122.5 g. of product, 4-(3-diethylaminopropyl)pyridine, boiling at 100–103° C. at 2 mm.

(b) 4 - (3 - diethylaminopropyl) - 1 methylpyridinium bromide, methobromide.—Reacting the base, 4-(3-diethylaminopropyl)pyridine, prepared in Example 12(a), with excess methyl bromide, yields the diquaternary salt 4 - (3 - diethylaminopropyl) - 1 - methylpyridinium bromide methobromide, melting at about 173–174° C. The salt is purified by recrystallizing from isopropyl alcohol.

(c) Diethylmethyl[3 - (1 - methyl - 4 - piperidyl)propyl]ammonium bromide, hydrobromide.—The diquaternary salt prepared in 12(b), reduced as in the usual manner, yields diethylmethyl[3-(1-methyl-4-piperidyl)propyl]ammonium bromide hydrobromide, which melts at about 191–193° C., after crystallization from isopropyl alcohol.

EXAMPLE 13

Trimethyl[3 - (1 - methyl - 4 - piperidyl) - 3 - phenylpropyl]ammonium bromide, hydrobromide (a) 4 - [α - (2 - dimethylaminoethyl)benzyl]pyridine. —A suspension of 20 g. sodamide in 200 ml. toluene is treated with a solution of 84.6 g. of 4-benzylpyridine in 100 ml. of toluene and the mixture then heated at 80–90° C. for one hour, cooled to 15° C. and treated with a toluene solution of 2-dimethylaminoethyl chloride (prepared from 80 g. of the hydrochloride salt). The temperature rises to 45° C. After the exothermic reaction subsides, the mixture is gradually heated and refluxed for two hours, cooled and to it is added 100 ml. of water. The aqueous layer is discarded and the organic phase, extracted with a solution of 93 ml. of concentrated hydrochloric acid in 160 ml. of water, and then with 25 ml. of water, contains 4-[α-(2-dimethylaminoethyl)benzyl] pyridine dihydrochloride. The aqueous layers are combined, cooled and basified with a solution of 60 g. of sodium hydroxide in 100 ml. of water. The liberated base is extracted with ether and dried over magnesium sulfate. After evaporation of the solvent, the product, fractionated to yield about 85.3 g. of 4-[α-(2-dimethylaminoethyl)benzyl]pyridine, a pale yellow distillate, B.P. about 133–135° C. (0.5 mm.).

(b) 4 - [α - (2 - dimethylaminoethyl)benzyl] - 1-methylpyridinium bromide, methobromide.—A solution of 36 g. (0.15 mole) of the base, prepared in 13(a), in 100 ml. of absolute alcohol is treated with a solution of 57 g. (0.6 mole) of methyl bromide in 100 ml. of acetone. The mixture becomes warm and some cooling is necessary. After standing for three days at room temperature, the mixture is cooled and filtered; yield about 61.2 g.; M.P. about 162–164° C. (dec.). This hygroscopic material is recrystallized from 150 ml. of absolute alcohol; yield about 51.2 g. (75%) of the diquaternary salt; M.P. about 154–156° C. (dec.). Analysis of this hygroscopic material indicates that it is solvated.

(c) Trimethyl - [3 - (1 - methyl - 4 - piperidyl) - 3-phenylpropyl]ammonium bromide, hydrobromide.—A solution of 30 g. (0.061 mole) of the diquaternary salt prepared in 13(b) in 150 ml. of absolute alcohol is treated with 0.3 g. of platinum oxide and placed in a Parr apparatus at fifty-five pounds of hydrogen. Reduction is complete in six hours. The catalyst is filtered and the filtrate diluted with about 600 ml. ether to give an oil which gradually solidifies yielding about 28 g. trimethyl-[3 - (1 - methyl - 4 - piperidyl) - 3 - phenylpropyl]ammonium bromide hydrobromide, melting at about 242–244° C. After recrystallization from 120 ml. absolute alcohol, the colorless product weights about 21.5 g. and melts at about 250–252° C.

Use of molar equivalent of (2-pyrrolidino)ethyl chloride in place of 2-dimethylaminoethyl chloride in Example 13 yields first 4-[α-(2-pyrrolidinoethyl)benzyl]-1-methylpyridinium bromide methobromide, and then methyl - [3 - (1-methyl-4-piperidyl)-3-phenylpropyl]pyrrolidinium bromide hydrobromide.

Use of a molar equivalent of ethyl chloride in place of methyl bromide in section (b) of Example 13 yields first 4 - [α-(2-dimethylaminoethyl)benzyl]-1-ethylpyridinium chloride ethochloride, and then dimethylethyl-[3-(1 - ethyl - 4-piperidyl)-3-phenylpropyl]ammonium chloride hydrochloride.

EXAMPLE 14

Use of a molar equivalent of morpholine in place of pyrrolidine in Example 2 yields first 4-(3-morpholinopropyl)-1-methylpyridinium bromide methobromide, and then 1 - methyl - 1-[3-(1-methyl-4-piperidyl)propyl]morpholinium bromide hydrobromide.

EXAMPLE 15

[4-(1-methyl-3-piperidyl)butyl]trimethylammonium bromide, hydrobromide (a) 3-(4'-dimethylamino-1'-butenyl)-1-methylpyridinium bromide, methobromide.—A cold solution of 20 g. N-methylmetanicotine in 100 ml. absolute alcohol is cooled and heated with 43 g. methyl bromide gas. A crystalline product soon separates. After standing for two days at room temperature, the diquaternary salt, 3 - (4' - dimethylamino - 1'-butenyl)-1-methylpyridinium bromide, methobromide, filtered and dried, weighs about 37.7 g. and melts at about 218–220° C. The product crystallized from 450 ml. of absolute alcohol weighs about 35.1 g. and melts at about 225–227° C. (dec.).

(b) [4 - (1-methyl-3-piperidyl)butyl]trimethylammonium bromide, hydrobromide.—A suspension of 19.5 g. of the diquaternary salt, prepared in Example 15(a), in 160 ml. of absolute alcohol is treated with platinum oxide and placed under fifty pounds of hydrogen. The theoretical quantity of hydrogen is consumed in twenty-five minutes, the mixture is then filtered and the filtrate diluted with about 300 ml. ether. The resulting crystalline product, [4-(1-methyl-3-piperidyl)butyl]trimethylammonium bromide hydrobromide, filtered and dried, weighs about 19 g. and melts at about 207–209° C. After recrystallization from 50 ml. absolute alcohol, the product weighs about 15.7 g. and melts at about 209–210° C.

Alternatively, the same product is formed using the diquaternary salt 3 - (4 - dimethylaminobutyl)-1-methylpyridinium bromide methobromide, prepared from its corresponding base, and proceeding as in section (b) of Example 1.

The foregoing example shows that acid-addition quaternary compounds of this invention in which the side chain is attached to the 3-position of the R-substituted saturated heterocyclic group also may be prepared by the method which essentially comprises interacting a base of the general formula

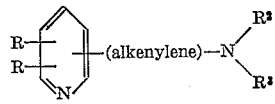

with a quaternizing agent, R⁴-anion, in a solvent for the reactants; and the resulting diquaternary salt may then be reduced in the conventional manner.

EXAMPLE 16

[4-(1-methyl-3-piperidyl)butyl]trimethylammonium methylsulfate, hydrogen methyl sulfate (a) 3 - (4'-dimethylamino-1'-butenyl)-1-methylpyridinium methylsulfate, dimethosulfate.—A cold solution of 5 g. of N-methyl metanicotine in 10 ml. of methanol is treated with 10.7 g. dimethylsulfate in 10 ml. methanol; and the mixture is diluted with ether and the residue crystallized from isopropyl alcohol. The product, 3-(4'-dimethylamino-1'-butenyl)-1-methylpyridinium methylsulfate, dimethosulfate, weighs about 9.8 g., M.P. 157–159° C.

This diquaternary salt, reduced as in Example 15(b), yields [4 - (1 - methyl-3-piperidyl)butyl]trimethylammonium methylsulfate hydrogen methyl sulfate.

EXAMPLE 17

Trimethyl[3-(1-methyl-4-piperidyl)propyl]ammonium tartrate, tartaric acid salt (a) 4,4'-methylenebis (3-hydroxy-2-naphthoic acid), disalt with 4-(3-dimethylaminopropyl)-1-methylpyridinium ion, methyl ion.—A filtered solution of 29 g. 4-(3-dimethylaminopropyl) - 1 - methyl - pyridinium bromide methobromide, prepared in section (b) of Example 1, in 82 ml. water and 53 ml. acetone is added to a solution of 31.4 g. 4,4'-methylenebis(3-hydroxy-2-naphthoic acid) disodium salt in 330 ml. water and the resulting mixture cooled. The yellow oil which separates crystallizes on standing and is filtered. The product, 4,4'-methylenebis (3-hydroxy-2-naphthoic acid), disalt with 4-(3-dimethylaminopropyl)-1-methylpyridinium ion, methyl ion, weighs 52 g.

(b) Trimethyl[3 - (1 - methyl-4-piperidyl)propyl]ammonium tartrate, tartaric acid salt.—The product prepared in 17(a) is dissolved in 320 ml. of boiling water, and a solution of 48 g. tartaric acid in 80 ml. of water is added. The regenerated free carboxylic acid is removed by filtration of the hot solution and washed twice with 200 ml. portions of hot water. The combined filtrate and washings are concentrated in an open dish on the steam bath to a syrup-like residue.

The material is dissolved in 250 ml. water and reduced under 50 lbs./pressure over 2 g. of 5% rhodium-on-charcoal catalyst. No additional hydrogen is taken up after three hours shaking at room temperature. The catalyst is filtered off and the solvent evaporated under 40 mm. The residue, a light green glass-like product, trimethyl[3 - (1 - methyl-4-piperidyl)propyl] ammonium tartrate, tartaric acid salt, weighs 45 g. It is crystallized from 95% ethanol by repeated extractions. From the extracts on standing a syrup separates which, after a day or more, slowly crystallizes. This material, recrystallized from absolute ethanol, melts at about 148–152° C. (A mixed melting point with a sample prepared by the alternative route is 148–152° C.)

The product has the following standard formula:

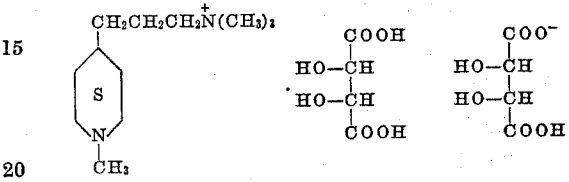

Alternatively, the acid-addition quaternary ammonium tartrate product can be prepared as follows:

(c) 4,4'-methylenebis (3-hydroxy-2-naphthoic acid), disalt with trimethyl-3-(1-methyl-4-piperidyl)propyl ammonium ion.—A solution of 5 g. of [3-(1-methyl-4-piperidyl)propyl]trimethyl ammonium bromide hydrobromide, prepared in Example 1, in 15 ml. water and 10 ml. acetone is added to a solution of 5.6 g. of 4,4'-methylenebis(3-hydroxy-2-naphthoic acid)disodium salt in 75 ml. water and the resulting solution cooled. The yellow solid which separates out is filtered off, and while wet, recrystallized with slight agitation from 200 ml. 10% acetone solution. The product, 4,4'-methylenebias(3-hydroxy-2-naphthoic acid), disalt with trimethyl-3-(1-methyl-4-piperidyl)propyl ammonium ion, weighs 6.5 g. and has an indefinite melting point.

(d) Trimethyl[3-(1-methyl-4-piperidyl)propyl]ammonium tartrate, tartaric acid salt.—The product prepared in Example 17(c) is dissolved in 55 ml. boiling water and a solution of 6.5 g. tartaric acid in 20 ml. water is added. The liberated dicarboxylic acid is filtered off and the solid washed twice with 50 ml. portions of hot water. The combined filtrate and washings concentrated under a vacuum of 2 mm. and the syrupy residue is crystallized four times from 95% ethanol. The product, trimethyl [3-(1-methyl-4-piperidyl)propyl]ammonium tartrate, tartaric acid salt, weighs 2 g. and melts at about 144–148° C.

Analysis.—Calcd. for $C_{20}H_{38}N_2O_8$: C, 47.17; H, 7.68; N, 5.62. Found: C, 47.03; H, 7.55; N, 5.56.

A sample recrystallized from absolute ethanol melts at about 148–152° C.

EXAMPLE 18

Trimethyl[3-(decahydro-1-methyl-4-quinolyl)propyl] ammonium bromide, hydrobromide Using a suspension of 10 g. of the diquaternary salt 4-(3-dimethylaminopropyl) - 1 - methylquinolinium bromide methobromide, prepared in Example 11(b), in 160 ml. of absolute alcohol is treated with 0.6 g. of platinum oxide and the mixture placed in a Parr apparatus under forty-four pounds of hydrogen. After the calculated quantity (five equivalents) of hydrogen have been consumed, and proceeding as in Example 11 yields trimethyl[3 - (decahydro-1-methyl-4-quinolyl)propyl]ammonium bromide hydrobromide.

EXAMPLE 19

Trimethyl[3-(1,2,3,4-tetrahydro-1-methyl-4-quinolyl) propyl]ammonium tartrate, tartaric acid salt (a) 4,4' - methylenebis-(3-hydroxy-2-naphthoic acid), disalt with trimethyl[3-(1,2,3,4-tetrahydro-1-methyl-4-quinolyl)propyl]ammonium ion.—A solution of 41.1 g. of the diquaternary salt prepared in 11(b) in 50 ml. of water and 100 ml. of absolute alcohol is reduced in the same manner as described in 11(c). The catalyst is filtered and the filtrate diluted with 250 ml. of water, warmed to 60° C. and then rapidly added to a solution of 44.1 g. of 4,4'-methylenebis(3-hydroxy-2-naphthoic acid)disodium salt in 400 ml. of water at 60° C. A greenish-yellow oil rapidly separates from the mixture. The material becomes a semi-solid on cooling. The mother liquor is decanted and the product, 4,4'-methylenebis(3-hydroxy-2-naphthoic acid), disalt with trimethyl[3 - (1,2,3,4 - tetrahydro - 1 - methyl-4-quinolyl) propyl]ammonium ion, triturated with 400 ml. of cold water.

(b) *Trimethyl[3-(1,2,3,4-tetrahydro-1-methyl-4-quinolyl]ammonium tartrate, tartaric acid salt.*—The product prepared in 19(a) is suspended in 400 ml. of hot 95% alcohol and diluted with 400 ml. of water and heated to about 80° C. The gradual addition of about 500 ml. of acetone results in a clear solution at 60° C. which is then treated with a warm solution of 30.6 g. of tartaric acid in 50 ml. of alcohol and 50 ml. of water. The regenerated acid separates from the mixture. After allowing the mixture to cool to room temperature, the acid is filtered and washed with three 100 ml. portions of warm water. The filtrate is concentrated under reduced pressure to remove the acetone and alcohol until the volume is about one liter. A heavy precipitate of the regenerated acid separates. After standing for several hours at room temperature, the acid is filtered and washed with cold water. The filtrate is treated with Darco and filtered. The colorless filtrate is concentrated under reduced pressure until the volume is about 150 ml. The residue is diluted with 200 ml. of absolute alcohol and the solution distilled under reduced pressure. The residue is again treated with 200 ml. of absolute alcohol and the solvent removed in the same manner. The residue is then triturated with 300 ml. of acetone and allowed to stand for several hours. The acetone is decanted and the oil is dissolved in 50 ml. of water and diluted with 800 ml. of absolute alcohol to yield an oil which is triturated with 300 ml. of absolute alcohol. The material partly crystallizes. After removal of last traces of solvent by evacuation, the product, a colorless solid, is trimethyl[3 - (1,2,3,4 - tetrahydro - 1 - methyl-4-quinolyl) propyl]ammonium tartrate, tartaric acid salt.

The invention may be variously otherwise embodied within the scope of the appended claims.

We claim:

1. Acid-addition salts of compounds of the general formula:

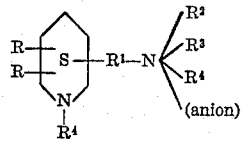

each R represents a member of the class consisting of hydrogen and lower alkyl, and when taken together with the piperidyl group to which they are joined, form a polyhydroquinolyl group; $R^1$ is a member of the class consisting of alkylene and phenyl-substituted alkylene; $R^2$ and $R^3$ each represent a lower alkyl group and when taken together with the nitrogen represent 1-piperidyl, 4-morpholinyl and 1-pyrrolidyl; each $R^4$ represents a member of the class consisting of lower alkyl and aralkyl groups.

2. An acid-addition salt of a piperidine compound of the general formula:

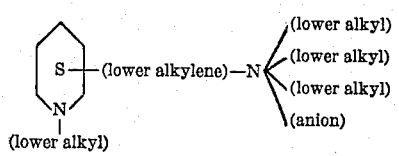

3. An acid-addition salt of a quinolyl compound of the general formula:

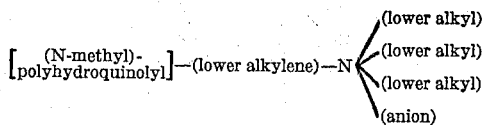

4. An acid-addition salt of a tetrahydroquinolyl compound of the general formula:

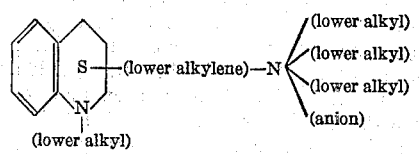

5. An acid-addition salt of a piperidine compound of the general formula:

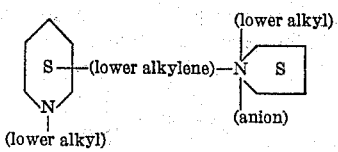

6. An acid-addition salt of a piperidine compound of the general formula:

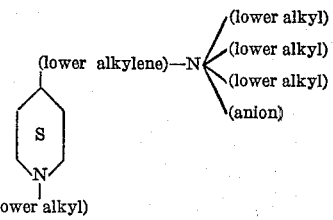

7. The method which essentially comprises catalytic hydrogenating of a diquaternary salt of the general formula:

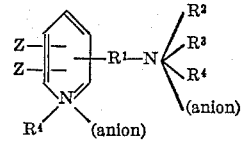

wherein each Z represents a member of the class consisting of hydrogen and lower alkyl and when taken together with the pyridyl group to which they are joined, form a quinolyl group; $R^1$ is a member of the class consisting of alkylene and phenyl-substituted alkylene; $R^2$ and $R^3$ each represent a lower alkyl group and when taken together with the nitrogen represent 1-piperidyl, 4-morpholinyl and 1-pyrrolidyl; each $R^4$ represents a member of the class consisting of lower alkyl and aralkyl groups, and recovering the reaction product, an acid-addition salt of a compound of the general formula

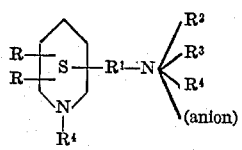

wherein $R^1$, $R^2$, $R^3$ and $R^4$ have the meaning given hereinbefore, and each R represents a member of the class consisting of hydrogen and lower alkyl, and when taken together with the piperidyl group to which they are joined, form a polyhydroquinolyl group.

8. The method of claim 6 wherein the catalytic-hydrogenation is effected with platinum oxide in ethanol.

9. The method which essentially comprises interacting a base of the general formula

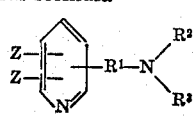

with a quaternizing agent, R⁴-(anion), to form a diquaternary compound of the general formula:

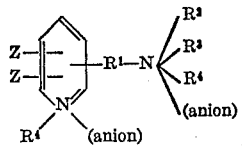

wherein each Z represents a member of the class consisting of hydrogen and lower alkyl and when taken together with the pyridyl group to which they are joined, form a quinolyl group; $R^1$ is a member of the class consisting of alkylene and phenyl-substituted alkylene; $R^2$ and $R^3$ each represent a lower alkyl group and when taken together with the nitrogen represent 1-piperidyl, 4-morpholinyl and 1-pyrrolidyl; each $R^4$ represents a member of the class consisting of lower alkyl and aralkyl groups, catalytic-hydrogenating said quaternary compound, and recovering the reaction product, an acid-addition salt of a compound of the general formula

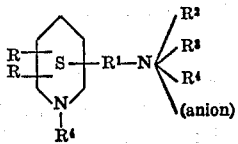

wherein $R^1$, $R^2$, $R^3$ and $R^4$ have the meaning given hereinbefore, and each R represents a member of the class consisting of hydrogen and lower alkyl, and when taken together with the piperidyl group to which they are joined, form a polyhydroquinolyl group.

10. An acid-addition salt of trimethyl [3-(1,2,3,4-tetrahydro-1-methyl-4-quinolyl)propyl] ammonium bromide.

11. An acid-addition salt of (1-methyl-4-piperidyl) (lower alkyl) trimethylammonium bromide.

12. An acid-addition salt of [3-(1-methyl-4-piperidyl)propyl] trimethylammonium bromide.

13. An acid-addition salt of 1-methyl-1-[3-(1-methyl-4-piperidyl)propyl]pyrrolidinium bromide.

14. An acid-addition salt of [3-(1-methyl-4-piperidyl)-3-phenylpropyl]trimethylammonium bromide.

References Cited in the file of this patent

UNITED STATES PATENTS 2,684,965     Weston et al. _____ July 27, 1954

OTHER REFERENCES

Leonard et al.: Jour. Am. Chem. Soc., vol. 73, pp. 3325–9 (1951).